US008458049B2

(12) United States Patent
Wei (10) Patent No.: US 8,458,049 B2
(45) Date of Patent: Jun. 4, 2013

(54) IDENTIFYING A SECONDARY DESIGNATION OF AN ITEM (75) Inventor: Kun Wei, Shanghai (CN)

(73) Assignee: eBay Inc., San Jose, CA (US)

( * ) Notice: Subject to any disclaimer, the term of this patent is extended or adjusted under 35 U.S.C. 154(b) by 333 days.

(21) Appl. No.: 12/830,200

(22) Filed: Jul. 2, 2010

(65) Prior Publication Data
US 2011/0112935 A1 May 12, 2011

Related U.S. Application Data (63) Continuation of application No. PCT/CN2009/001256, filed on Nov. 13, 2009.

(51) Int. Cl.
G06Q 30/00 (2012.01)
G06F 7/00 (2006.01)

(52) U.S. Cl.
USPC ........ 705/26.41; 705/26.1; 707/803; 707/804

(58) Field of Classification Search
USPC ..................... 705/26.1, 26.41, 27.1; 707/769, 707/780, 803, 804
See application file for complete search history.

(56) References Cited

U.S. PATENT DOCUMENTS

| 7,870,031 | B2* | 1/2011 | Bolivar ........................ 705/26.1 |
| 8,108,260 | B2* | 1/2012 | Maguire et al. .............. 705/26.1 |
| 2003/0120662 | A1 | 6/2003 | Vishik |
| 2006/0095370 | A1 | 5/2006 | Seth et al. |
| 2010/0042467 | A1* | 2/2010 | Bundy et al. ..................... 705/10 |
| 2010/0082410 | A1* | 4/2010 | Baudin et al. ................... 705/10 |
| 2010/0106618 | A1* | 4/2010 | Su ................................... 705/26 |
| 2010/0153229 | A1* | 6/2010 | Bursey et al. .................. 705/26 |
| 2011/0016025 | A1* | 1/2011 | Gaisford ....................... 705/27.1 |

FOREIGN PATENT DOCUMENTS

| CN | 101276361 | 10/2008 |
| JP | 2004199421 | 7/2004 |
| KR | 20090032277 | 4/2009 |
| WO | WO-2001008071 A1 | 2/2001 |
| WO | WO-2006133007 A2 | 12/2006 |

OTHER PUBLICATIONS

Anon., "Novation, the Health Care Industry's Leader in Supply Contracting, Selects Zoomix Accelerator to Automate the Management of Supply Chain Data," PR Newswire, Jan. 15, 2008.*

(Continued)

Primary Examiner — Nicholas D Rosen
(74) Attorney, Agent, or Firm — Schwegman, Lundberg & Woessner, P.A.

(57) ABSTRACT

An item designation machine receives a seller-generated description of an item available for sale. The description is received from a seller of the item. The item designation machine identifies a proposed designation of the item based on the description of the item and presents the proposed designation to the seller. Where the seller refuses the proposed designation and selects a primary designation of the item distinct from the proposed designation, the item designation machine receives the selection from the seller and identifies the proposed designation as a secondary designation of the item. The item designation machine stores the primary and secondary designations in an item record within an item database of the network-based publication system. The item record indicates that the item is a specimen of the primary and secondary designations. The item designation machine lists the item as available for sale.

20 Claims, 8 Drawing Sheets

OTHER PUBLICATIONS

"International Application Serial No. PCT/CN2009/001256, Search Report mailed Apr. 29, 2010", 4 pgs.

"International Application Serial No. PCT/CN2009/001256, Written Opinion mailed Jun. 17, 2010", 4 Pgs.

Cheng, et al., "Hierarchical Classification of Documents with Error Control", PAKDD 2001, LNAI 2035, (2001), 433-443.

* cited by examiner

SELL YOUR ITEM

Description

Please enter a brief description for your item:

612 — | Canon PowerShot A1100 IS 12.1 Megapixel |

Please enter a detailed description for your item:

614 — | There's nothing more satisfying than taking great pictures! And with the Canon PowerShot A1100 IS it's so effortless. The 12.1-megapixel resolution and 4x optical zoom with Optical Image Stabilizer ensure radiant, detailed images. Plus, you've got an advanced DIGIC 4 Image Processor with evolved Face Detection technology and the Face Detection Self-timer for extraordinary control and performance. Smart Auto lets you handle challenging conditions with ease. |

Please enter a price or price range for your item:

616 — | $110.00 | Min    618 — | (none) | Max

Primary Category

Please select a primary category for your item:

We propose:

620 — ➤ Cameras & Photo > Digital Cameras   [best-selling!]

Click "*Next*" to accept, or select a different category:

630 — | Electronics > Consumer > Personal        ▽ |

640 — | Back |   650 — | Next |

*FIG. 6*

ITEM SEARCH RESULTS

700

Find:
710 — | digital camera | Go!

Results found for digital camera

720 — | Electronics > Consumer > Personal |

722 → ☐ Canon PowerShot A1100 IS 12.1 Megapixel     $110.00

☐ Sony CyberShot DSC-T500 10.1 Megapixel     $152.50

730 — | Camera & Photo > Digital Cameras |

722 → ☐ Canon PowerShot A1100 IS 12.1 Megapixel     $110.00

☐ Kodak EasyShare M340 10.2 MP 2.7 LCD     $169.95

IDENTIFYING A SECONDARY DESIGNATION OF AN ITEM

RELATED APPLICATIONS

This application is a continuation under 35 U.S.C. §111(a) of Chinese PCT Application No. PCT/CN2009/001256, filed Nov. 13, 2009, entitled "Identifying a Secondary Designation of an Item," which is incorporated herein by reference in its entirety.

TECHNICAL FIELD

The subject matter disclosed herein generally relates to data processing. Specifically, the present disclosure addresses systems and methods of identifying a secondary designation of an item.

BACKGROUND

It is known that a network-based publication system is a system that publishes information using a network. For example, a network-based publication system may include a machine (e.g., a computer) programmed by software to implement a module that publishes information via a network connected to the machine. The network-based publication system may implement an Internet-accessible website that enables online shopping, classified advertising, information search, information retrieval, online auctions, or any combination thereof.

A network-based publication system may list an item, and in some cases, the network-based publication system may list the item as available for sale. For example, a website may list a used car as available for sale by its owner by presenting a classified advertisement that describes the car. As another example, a website may allow a user to search for digital cameras being sold by multiple sellers and, in response, present a list of available digital cameras to the user.

To facilitate data processing related to a listed item, a designation may be applied to the item. Examples of a designation include, but are not limited to, a category, a keyword, a classification, a genre, a tag, a label, a nickname, a product number, an attribute, or a characteristic. The designation may be applied to the item by the seller of the item, the network-based publication system, a third-party, or any combination thereof.

BRIEF DESCRIPTION OF THE DRAWINGS

Some embodiments are illustrated by way of example and not limitation in the figures of the accompanying drawings in which.

DETAILED DESCRIPTION

Example methods and systems are directed to identifying a secondary designation of the item. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In some example embodiments, an item designation machine is part of a network-based publication system in a network environment. The item designation machine receives a seller-generated description of an item available for sale. The description is received via a network from a seller of the item. The item designation machine identifies a proposed designation of the item based on the description received from the seller, and the item designation machine presents the proposed designation to the seller. The proposed designation is thus presented to the seller as a selectable choice for a primary designation of the item.

The seller, however, does not select the proposed designation and instead selects a primary designation of the item, the selected primary designation being distinct from the proposed designation. The seller thus generates and communicates a selection of the primary designation of the item. The item designation machine receives the selection of the primary designation from the seller and response to the received selection by identifying the proposed designation as the secondary designation.

The item designation machine stores the primary and secondary designations in an item record within an item database of the network-based publication system. This has the effect of representing the item as a specimen of the primary and secondary designations. The item designation machine lists the item as available for sale.

A potential buyer of the item searches the network-based publication system for the item, the primary designation, the secondary designation, or any combination thereof. In response, the item designation machine presents at least one of the primary designation or the secondary designation to the potential buyer. Furthermore, the item designation machine presents the item as a specimen of the primary designation, the secondary designation, or both.

In identifying the secondary designation of the item, the item designation machine may perform price distribution analysis, sales history analysis, keyword analysis, or any combination thereof. Where price distribution analysis is performed, the description of the item may include a price, a price range, or both, and the item designation machine accesses price distribution data stored in a price distribution database. The item designation machine may compare the price distribution data to the price, the price range, or any combination thereof and identify the secondary designation based on this comparison. For example, new items and used items often have significantly different price ranges, and if the price range of the item matches a price range for used items with similar descriptions, the item designation machine may identify a category containing those used items as the secondary designation of the item.

In performing sales history analysis, the item designation machine may access the sales history data stored in a sales history database and identify a best-selling designation. The best-selling designation may be a designation that is correlated with a sales history metric exceeding a threshold. The item designation machine may determine the best-selling designation, or the best-selling designation may be determined by another machine in the network-based publication system and stored as the sales history data in the sales history database for subsequent access by the item designation machine. After identifying the best-selling designation, the item designation machine may select the best-selling designation as the secondary designation of the item.

Where keyword analysis is performed, the description of the item may include one or more item keywords. The item designation machine may access one or more reference keywords stored in a keyword database. Each of the reference keywords may correspond to one or more potential designations that are applicable to an item. The item designation machine may match an item keyword to a reference keyword and identify a potential designation corresponding to the reference keyword as the secondary designation of the item available for sale. The match need not be an exact match, and techniques involving fuzzy logic may be used by the item designation machine to determine that an item keyword matches a reference keyword.

In some example embodiments, multiple item keywords may match multiple reference keywords, and the item designation machine may count a number of matches among item keywords and reference keywords. Based on the number of matches, the item designation machine may identify the secondary designation of the item.

Figure 1:
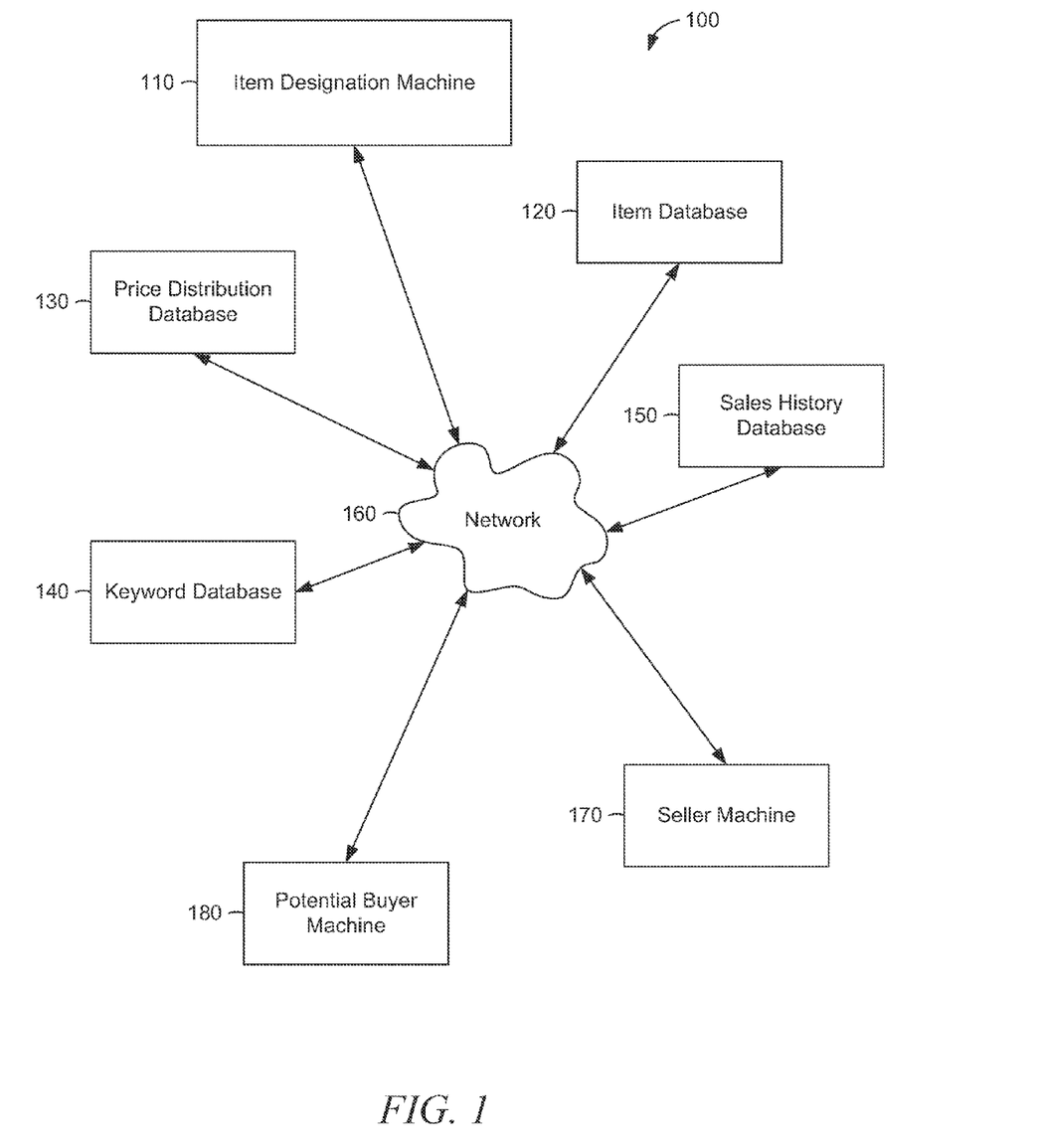
FIG. 1 is a diagram of a system to identify a secondary designation of an item, according to some example embodiments.

FIG. 1 is a diagram of a system 100 to identify a secondary designation of an item, according to some example embodiments. The system 100 includes an item designation machine 110, an item database 120, a price distribution database 130, a keyword database 140, a sales history database 150, a seller machine 170, and a potential buyer machine 180, connected to each other via a network 160.

The item designation machine 110 may be implemented in a computer system, as discussed below with respect to FIG. 8, and programmed by software to implement any one or more methodologies described herein. Accordingly, the item designation machine 110 may be a general purpose computer that has been modified by the software to be a special purpose computer The item database 120, the price distribution database 130, the keyword database 140, and the sales history database 150 are shown as separate databases, and each may be implemented in a separate machine (e.g., computer system). These databases, however, are combinable with each other, and any one or more of them may be implemented in a single machine, including the item designation machine 110. These databases may be any kind of database able to store data for access by the item designation machine 110. For example, any one or more of these databases may be implemented as a relational database, a triple store, a spreadsheet, or a text file.

The seller machine 170 may be implemented in a computer system programmed by software. The seller machine 170 enables the seller of the item to generate the description of the item and transmit the description to the item designation machine 110. Furthermore, the seller machine 170 enables the seller to view the proposed designation of the item, as presented by the item designation machine 110, and to transmit the seller's selection of the primary designation of the item to the item designation machine 110.

The potential buyer machine 180 may be implemented in a computer system programmed by software. The potential buyer machine 180 enables the potential buyer of the item to search the network-based publication system and to view the listed item for sale, as presented by the item designation machine 110. Although the item designation machine 110, the seller machine 170, and the potential buyer machine 180 are shown as separate machines, the separate machines may be combinable with each other, and any one or more of them may be implemented in a single machine.

The network 160 may be any network that enables communication between machines (e.g., the item designation machine 110 and the seller machine 170). Accordingly, the network 160 may be a wired network, a wireless network, or any combination thereof. The network 160 may include one or more portions that constitute a private network, a public network (e.g., the Internet), or any combination thereof.

Figure 2:
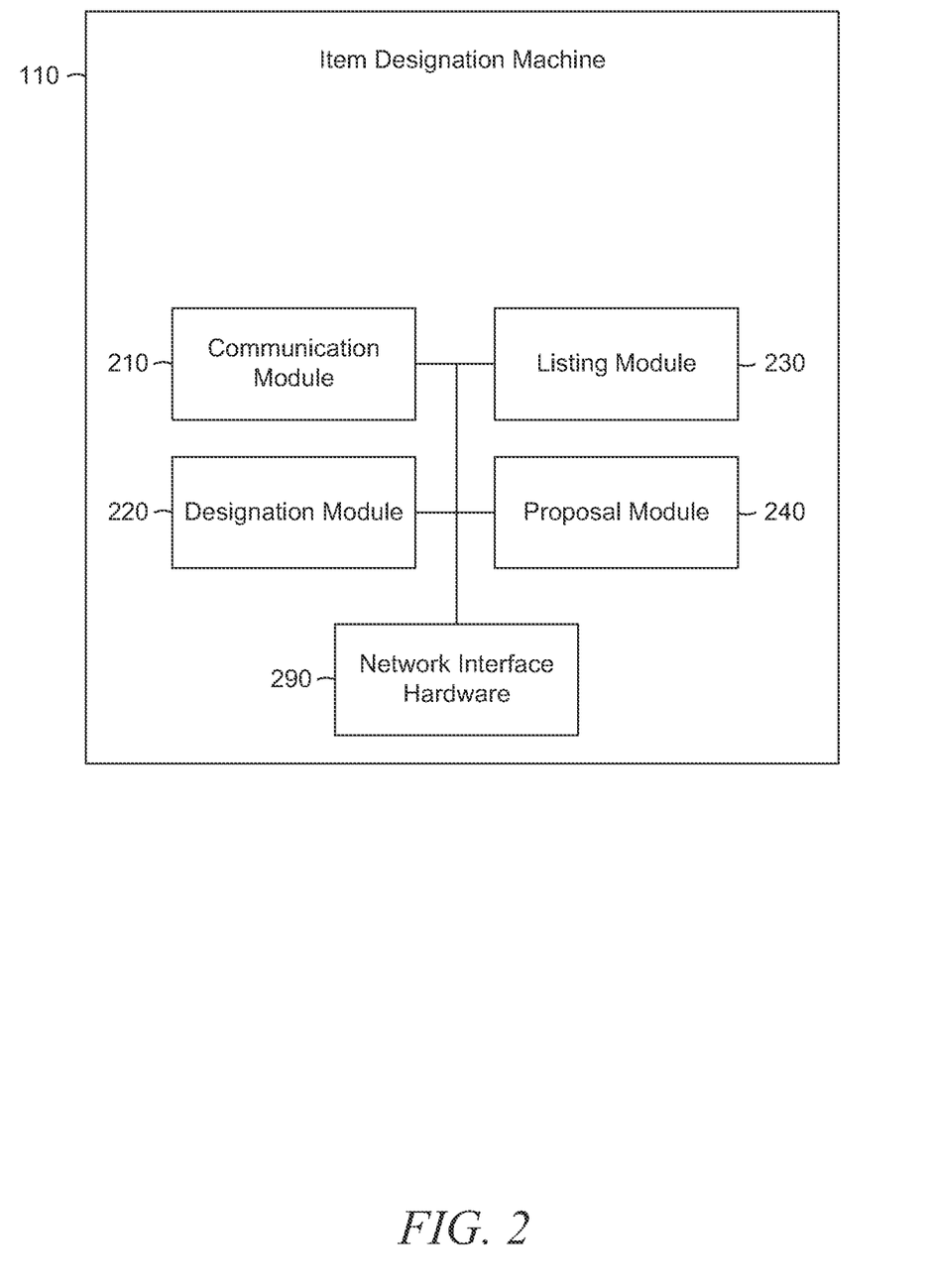
FIG. 2 is a block diagram illustrating an item designation machine, according to some example embodiments.

FIG. 2 is a block diagram illustrating the item designation machine 110, according to some example embodiments. The item designation machine 110 includes a communication module 210, a designation module 220, a listing module 230, a proposal module 240, and network interface hardware 290, in communication with each other (e.g., via a bus or shared memory).

The communication module 210, in some example embodiments, is a hardware-implemented module able to perform some functions of the item designation machine 110. Specifically, the communication module 210 may receive the seller-generated description of the item to be listed as available for sale. The description may be received from the seller (e.g., from the seller machine 170) via the network 160 and using the network interface hardware 290. The communication module 210 also may receive the selection of the primary designation of the item. The selection may be received from the seller via the network 160 and using the network interface hardware 290.

The designation module 220, according to some example embodiments, is a hardware-implemented module able to perform certain functions of the item designation machine 110. In particular, the designation module 220 may identify the secondary designation of the item based on the seller-generated description received by the communication module 210. The designation module 220 also may store the primary and secondary designations of the item in an item record within the item database 120.

The item record in the item database 120 may correspond to the item available for sale and, with the primary and secondary designations stored therein, functions to represent the item as a specimen of the primary and secondary designations. For example, where the primary and secondary designations are primary and secondary categories of items, the item record may indicate that the item is categorized within the primary category and within the secondary category.

According to various example embodiments, the designation module 220 may perform the price distribution analysis, the sales history analysis, the keyword analysis, or any combination thereof. To perform the price distribution analysis, the designation module 220 may access the price distribution database 130, compare the price or price range that is included in the description of the item to the price distribution data stored in the price distribution database 130, and identify the secondary designation based on the comparison. Moreover, to perform the sales history analysis, the designation module 220 may access the sales history database 150, identify the best-selling designation, and select the best-selling designation as the secondary designation of the item, based on the sales history data stored in the sales history database

150. Furthermore, to perform the keyword analysis, the designation module 220 may access the keyword database 140 and match an item keyword included in the description to a reference keyword stored in the keyword database 140.

The listing module 230, in certain example embodiments, is a hardware-implemented module able to list the item as available for sale. For example, the listing module 230 may access the item database 120 and generate a webpage that includes one or more portions of the item record corresponding to the item available for sale and present the webpage to the potential buyer (e.g., transmit the webpage to the potential buyer machine 180) via the network 160 and using the network interface hardware 290. The one or more portions of the item record may include the primary designation, the secondary designation, or any combination thereof. As another example, the listing module 230 may access the item database 120 and modify the item record so as to indicate that one or more portions of the item record are to be included in a webpage generated by another machine within the network-based publication system and presented to a potential buyer.

The proposal module 240, according to certain example embodiments, is a hardware-implemented module able to perform various functions of the item designation machine 110. Specifically, the proposal module 240 may identify a proposed designation of the item based on the seller-generated description of the item. The proposed designation may be selectable by the seller (e.g., by using the seller machine 170) as the primary designation of the item. The proposed designation may also be selectable by the designation module 220 as the secondary designation of the item. The proposal module 240 also may present the proposed designation to the seller (e.g., by transmitting the proposed designation to the seller machine 170).

The network interface hardware 290, according to various example embodiments, is a hardware component that enables the item designation machine 110 to communicate with other machines via the network 160. For example, the network interface hardware 290 may facilitate Internet Protocol (IP) communication between the item designation machine 110 and the seller machine 170 via the network 160.

Figure 3:
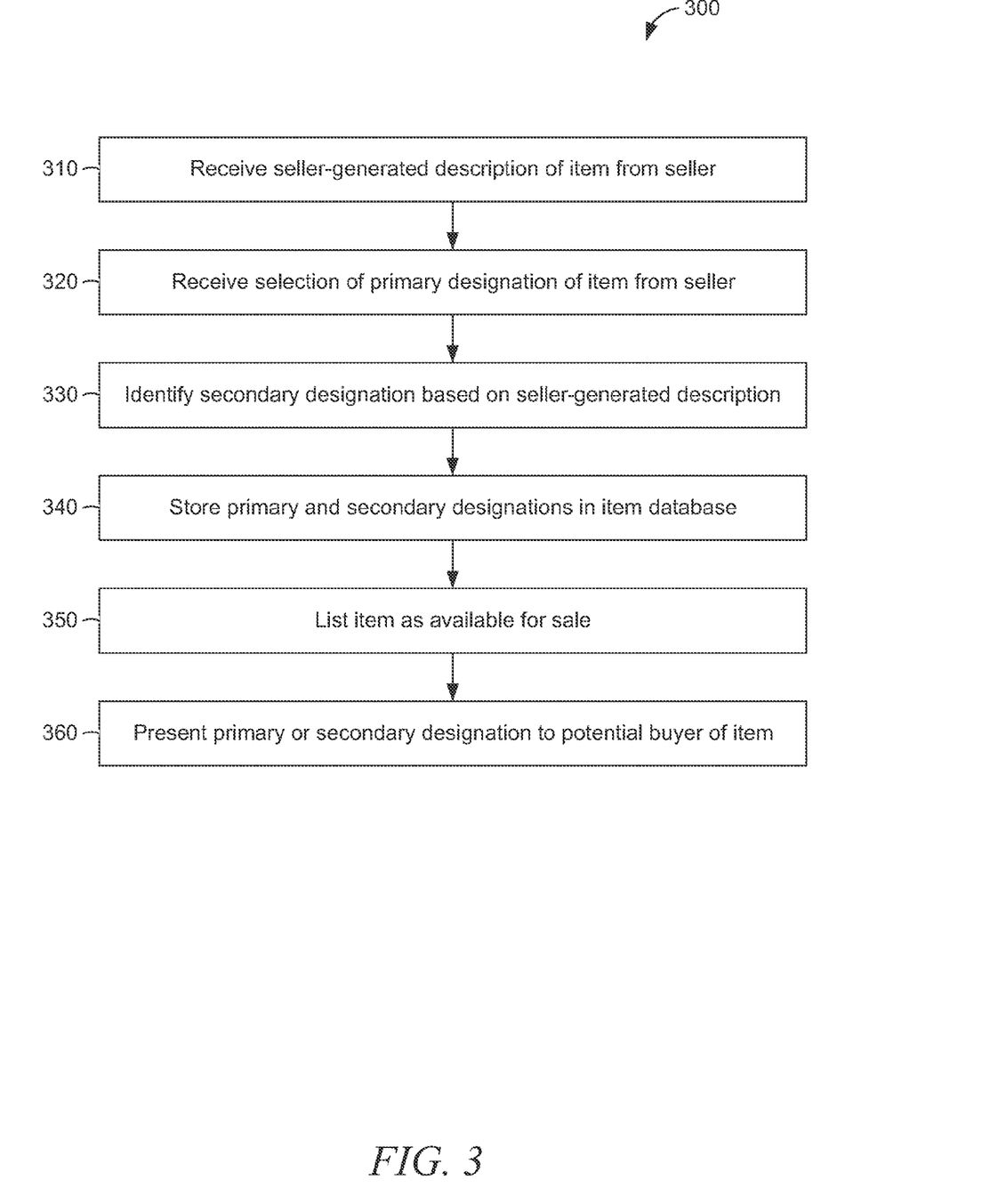
FIGS. 3-5 are flowcharts illustrating a method of identifying a secondary designation of an item, according to some example embodiments.
Figure 4:
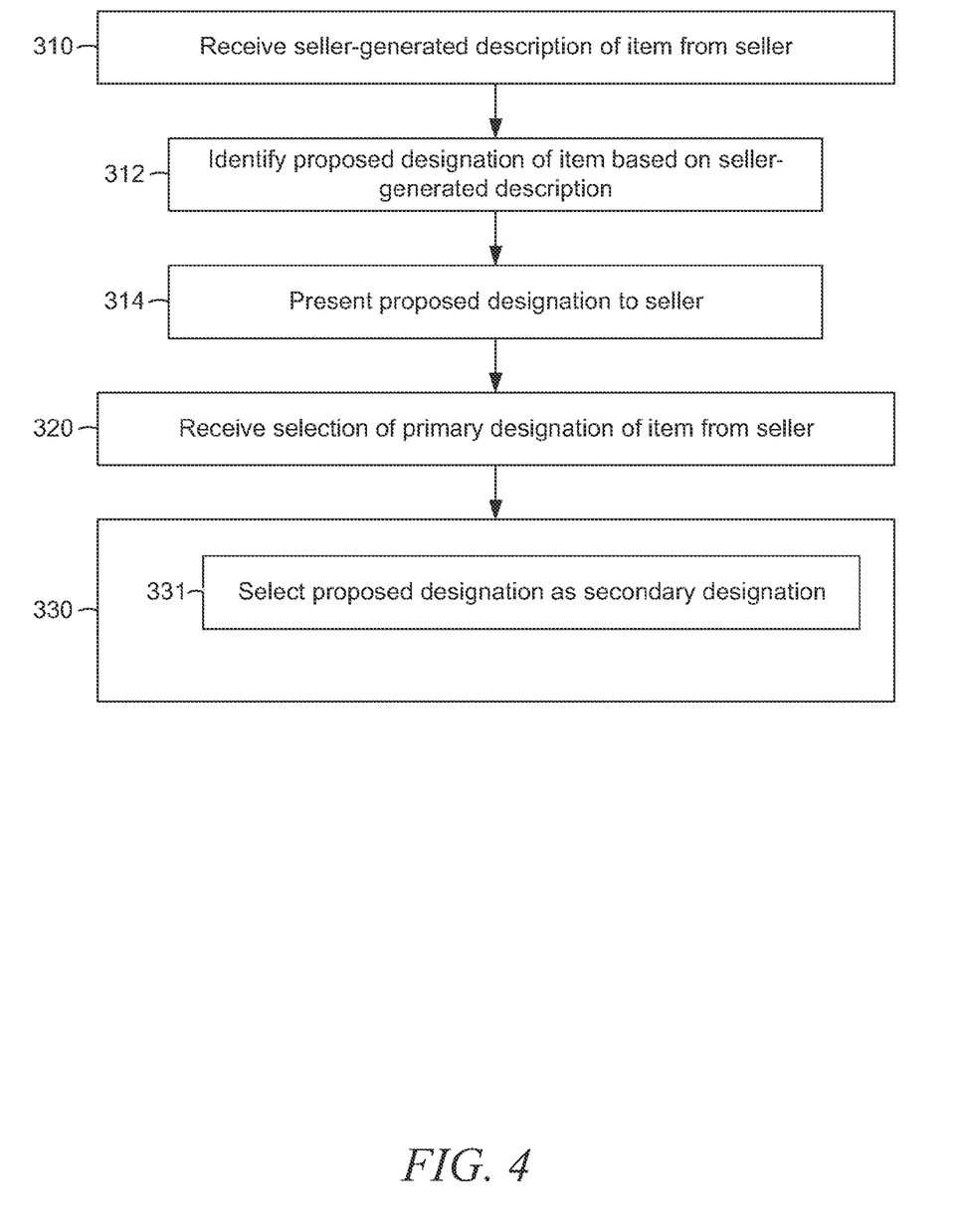
Figure 5:
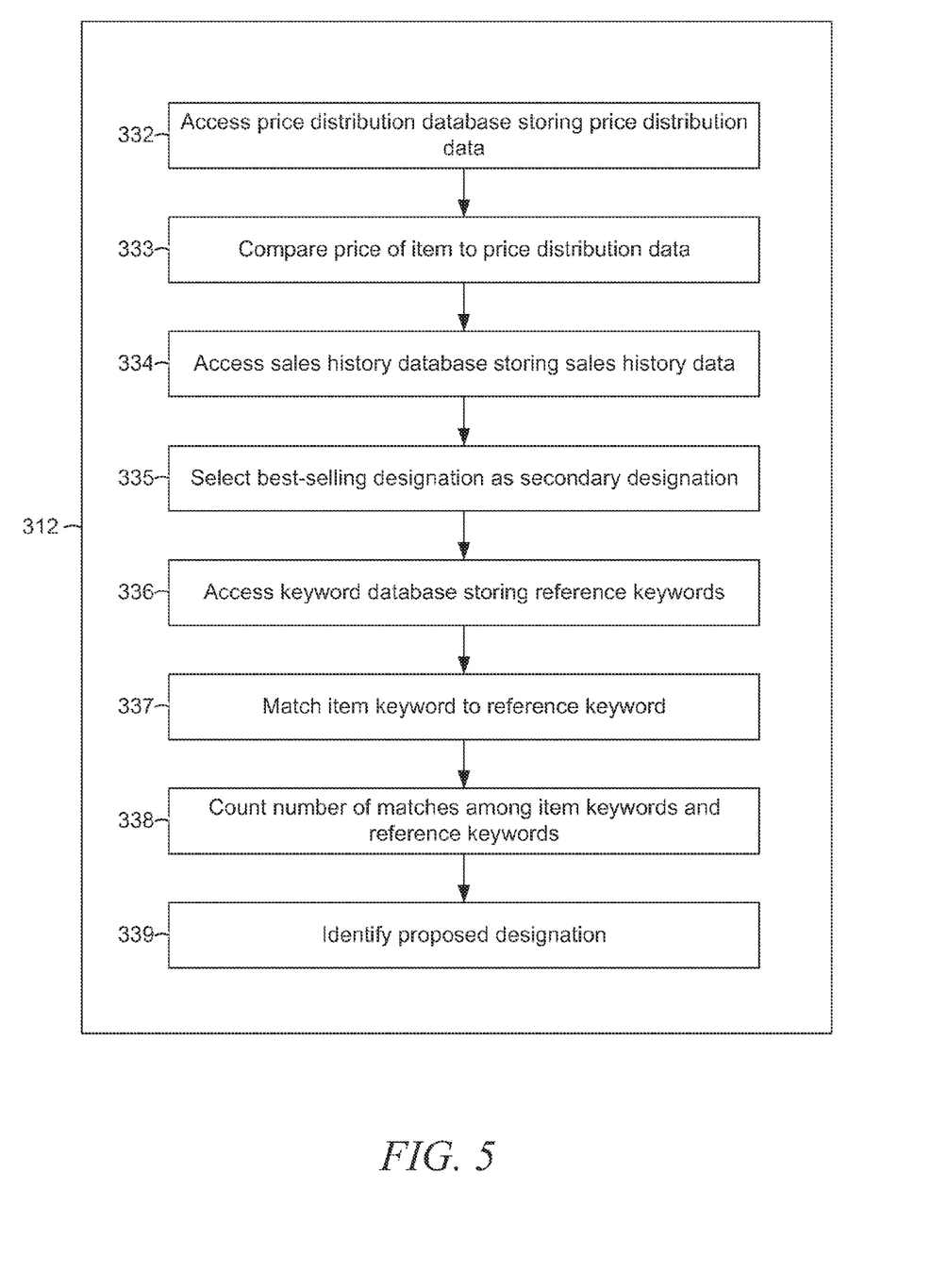

FIGS. 3-5 are flowcharts illustrating a method 300 of identifying a secondary designation of an item, according to some example embodiments. The method 300 includes operations 310-360, which are to be performed by one or more modules of the item designation machine 110, as discussed below.

Operation 310, as shown in FIGS. 3-4, is performed by the communication module 210 and involves receiving the seller-generated description of the item from the seller (e.g., from the seller machine 170) via the network 160. For example, the seller may use the seller machine 170 to generate and transmit a data structure containing the description of the item to the item designation machine 110, where the data structure is received by the communication module 210. The description may include a keyword, a price, a price range, or any combination thereof.

Operation 312, shown in FIG. 4, is performed by the proposal module 240 and involves identifying the proposed designation of the item based on the description of the item received in operation 310. As discussed above, the proposed designation may be selectable by the seller as the primary designation of the item and selectable by the designation module 220 as the secondary designation of the item. Further details of operation 312 are discussed below with respect to FIG. 5.

Operation 314, shown in FIG. 4, is performed by the proposal module 240 and involves presenting the proposed designation to the seller (e.g., by transmitting the proposed designation to the seller machine 170).

Operation 320, as shown in FIGS. 3-4, is performed by the communication module 210 and involves receiving a selection of the primary designation of the item from the seller (e.g., from the seller machine 170) via the network 160. For example, the seller may decide upon the selection and use the seller machine 170 to indicate and transmit the selection to the item designation machine 110, or the selection is received by the communication module 210. The selection references the primary designation of the item, as chosen by the seller.

Operation 330, as shown in FIGS. 3-4, is performed by the designation module 220 and involves identifying the secondary designation of the item based on the description of the item. As discussed above, the secondary designation of the item may be distinct from the primary designation selected by the seller. Operation 330 may include operation 331, which is performed by the designation module 220 and involves selecting the proposed designation identified in operation 312 as the secondary designation of the item.

Operation 340, shown in FIG. 3, is performed by the designation module 220 and involves storing the primary and secondary designations in the item record within the item database 120. For example, the designation module 220 may write the primary and secondary designations into an existing item record corresponding to the item available for sale. As another example, the designation module 220 may generate the item record to correspond to the item available for sale and to contain the primary and secondary designations of the item.

Operation 350, as shown in FIG. 3, is performed by the listing module 230 and involves listing the item as available for sale. As discussed above, listing the item may involve generating a webpage that includes one or more portions of the item record. Moreover, listing the item may involve modify the item record so as to indicate that the one or more portions are to be included in a webpage generated elsewhere. Furthermore, the one or more portions may include the primary designation, the secondary designation, or any combination thereof.

Operation 360, shown in FIG. 3, is performed by the listing module 230 and involves presenting the primary designation, the secondary designation, or both to the potential buyer of the item (e.g., by transmitting the webpage to the potential buyer machine 180) via the network 160.

FIG. 5 illustrates operation 312 of the method 300, according to some example embodiments. Operation 312 includes operations 332-339, any one or more of which may be performed by the proposal module 240.

Operation 332 involves accessing the price distribution database 130 to access the price distribution data stored therein. For example, operation 332 may involve requesting the price distribution data from the price distribution database 130. As discussed above, the price distribution data corresponds to one or more potential designations of items.

Operation 333 involves comparing a price of the item (e.g., a single price, a minimum price of a price range, or a maximum price of a price range) to the price distribution data accessed in operation 332. Operation 333 may involve identifying a secondary designation of the item based on this comparison. As an example, where a potential designation corresponds to a particular price range, and where the price of the item available for sale is within the particular price range, operation 333 may identify the potential designation as the proposed designation of the item.

Operation 334 involves accessing a sales history database 150 to access sales history data stored therein. As an example, operation 334 may involve requesting the sales history data from the sales history database 150. The sales history data is usable to identify the best-selling designation, and operation 334 may involve identifying the best-selling designation based on the sales history data. Operation 335 involves selecting the best-selling designation as the proposed designation of the item.

Operation 336 involves accessing the keyword database 140 to access the reference keywords stored therein. For example, operation 336 may involve requesting one or more reference keywords from the keyword database 140. As discussed above, the reference keywords each correspond to one or more potential designations applicable to an item. These correspondences may be stored in the keyword database 140.

Operation 337 involves matching an item keyword to a reference keyword. As discussed above, fuzzy logic techniques may be used, and the matching need not find an exact match. Operation 338 involves counting the number of matches among one or more item keywords and one or more reference keywords. Operation 339 involves identifying the proposed designation of the item based on the number of matches. For example, where a large number of item keywords is deemed to match a particular reference keyword, and where a potential designation corresponds to the particular reference keyword, operation 339 may identify the potential designation as the proposed designation of the item.

As discussed above with respect to operation 331, the proposed designation may be identified as the secondary designation of the item. In various example embodiments, however, any one or more of operations 332-339 may be adapted to directly facilitate identification of the secondary designation of the item, without identifying any proposed designation (e.g., without execution of operation 312 in the method 300). For example, the seller may select the proposed designation as the primary designation of the item. In such cases, any one or more of operations 332-339 may be performed by the designation module 220 to identify an alternative designation as the secondary designation of the item.

Figure 6:
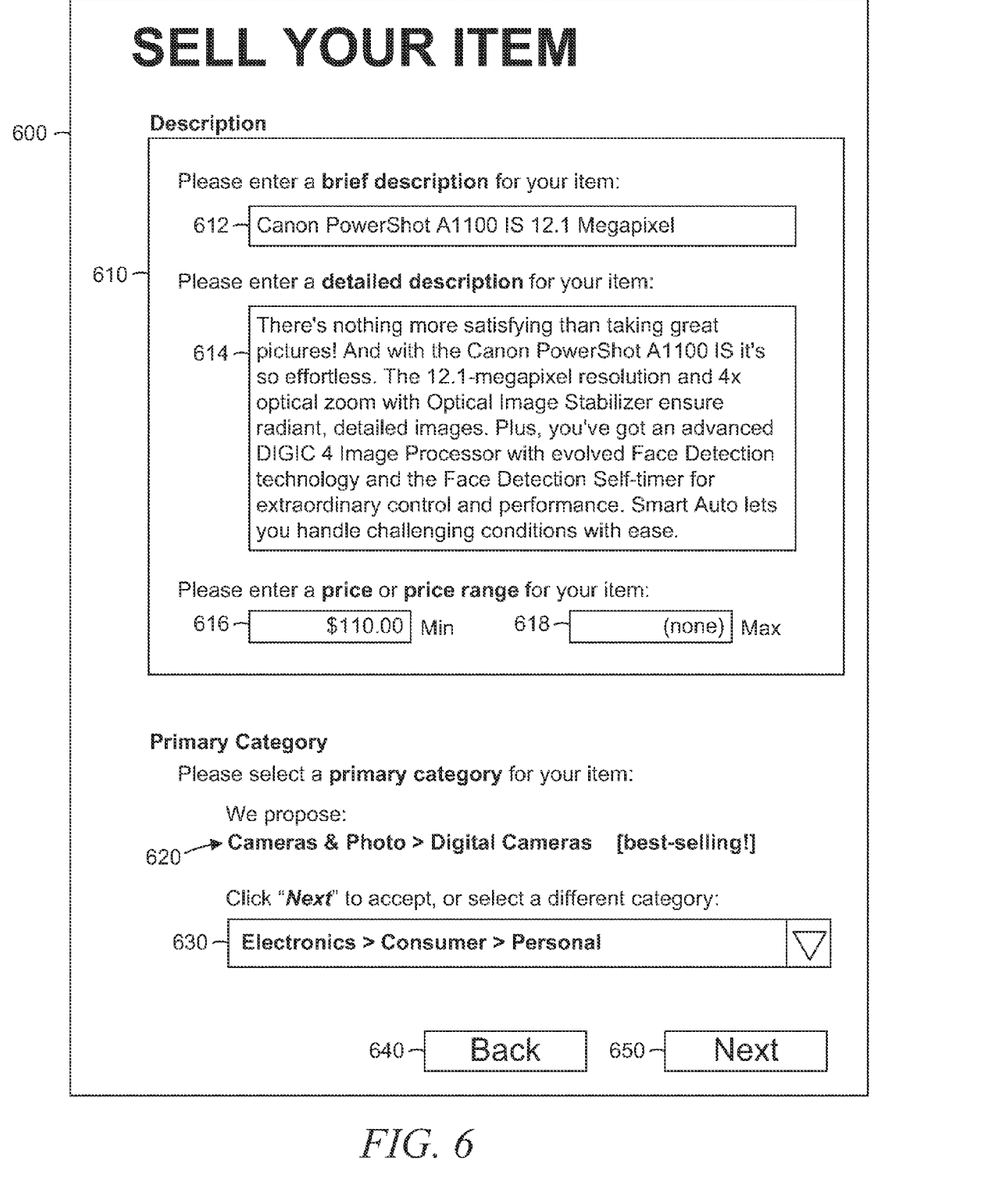
FIGS. 6-7 are diagrams illustrating graphical windows to facilitate identifying the secondary designation of an item, according to some example embodiments.

FIG. 6 illustrates a seller window 600 displayed to the seller by the seller machine 170, according to some example embodiments. The seller machine 170 may display the seller window 600 according to software provided by the item designation machine 110, another machine within the network-based publication system, or any combination thereof.

The seller window 600 may include a description interface 610, which further includes a brief description field 612, a detailed description field 614, a minimum price field 616, and a maximum price field 618. Using the description interface 610, the seller machine 170 may receive a seller-generated input from the seller to generate the description of the item available for sale. According to various example embodiments, the seller-generated input may include text data, numerical data, audio data (e.g., speech), video data, or any combination thereof.

The seller window 600 may further include a proposed designation 620 and a primary designation 630 of the item. As shown in FIG. 6, the proposed designation 620 is being presented to the seller, but the seller has selected the primary designation 630. The seller window 600 may indicate the proposed designation 620 as a best-selling designation. The primary designation 630 may be distinct from the proposed designation 620. Although FIG. 6 depicts the primary designation 630 as having been selected by the seller using a drop-down menu interface, the primary designation 630 may be selected using any user interface able to indicate a selection.

As illustrated in FIG. 6, the seller window 600 may include a back button 640 and a next button 650. The back button 640 may be operable by the seller to cancel any seller-generated input within the seller window 600, including any seller-generated input within the description interface 610. The next button 650 may be further operable by the seller to store the seller-generated input within the seller window 600.

Figure 7:
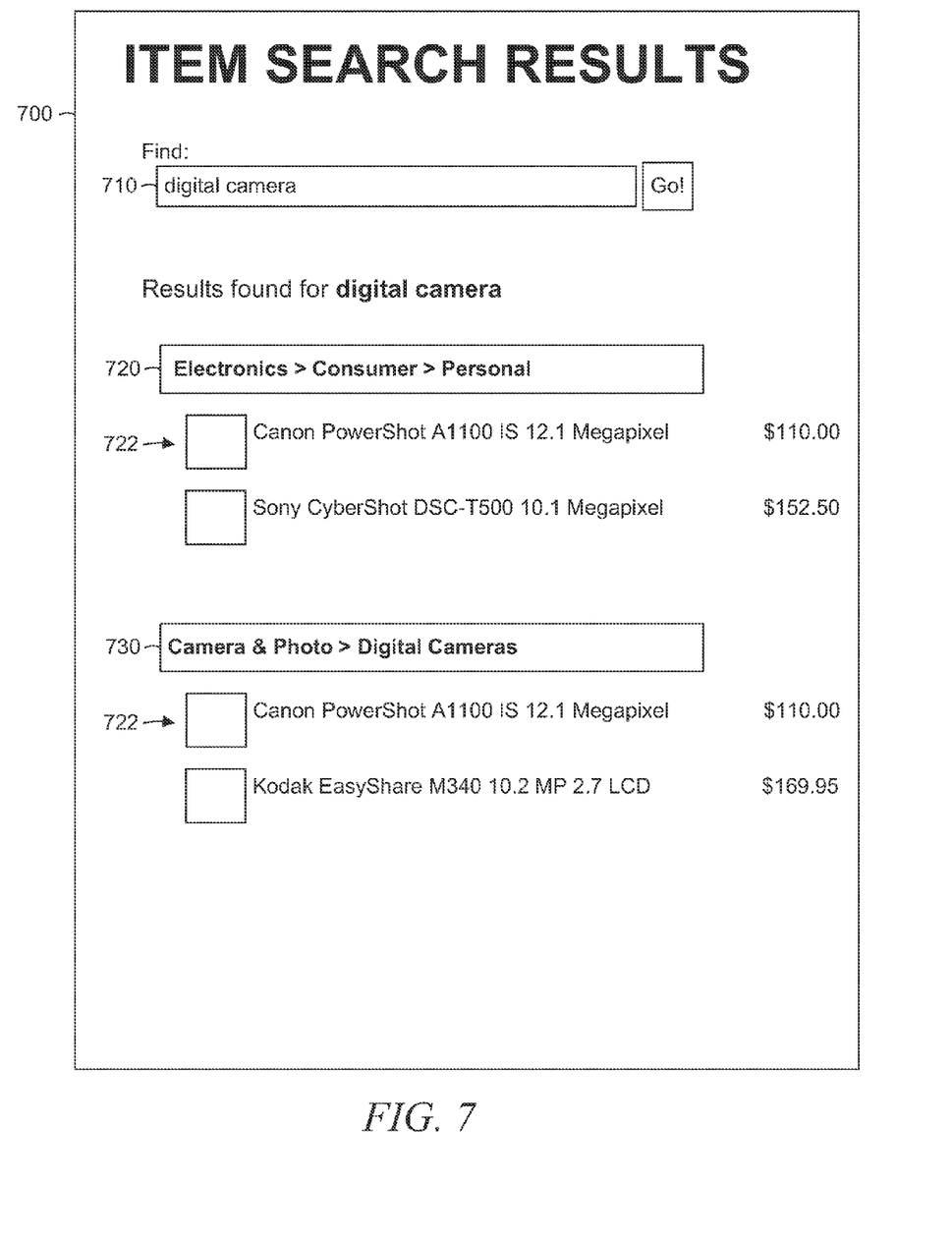

FIG. 7 illustrates a buyer window 700 displayed to the potential buyer by the potential buyer machine 180, according to some example embodiments. The potential buyer machine 180 may display the buyer window 700 according to software provided by the item designation machine 110, another machine within the network-based publication system, or any combination thereof.

The buyer window 700 may include a search field 710 and search results that include a primary designation field 720, a secondary designation field 730, and one or more instances of an item reference 722 that references the item available for sale. Using the search field 710, the potential buyer machine 180 may receive a query generated by the potential buyer. For example, the potential buyer may use search field 710 and the potential buyer machine 180 to submit one or more search terms to the network-based publication system. According to various example embodiments, the search field 710 may accept text data, numerical data, audio data (e.g., speech), video data, or any combination thereof.

The primary designation field 720 may display the primary designation 630 (e.g., as selected by the seller). The item is listed for sale by the network-based publication system (e.g., by the item designation machine 110). The buyer window 700 may present the item reference 722 under the primary designation 630 to indicate that the item is a specimen of the primary designation 630. As illustrated, the primary designation 630 is a specific category ("Electronics > Consumer > Personal"), and the buyer window 700 is presenting the item reference 722 ("Canon PowerShot A1100 IS 12.1 Megapixel") as a specimen of that specific category. One or more additional specimens may be indicated as grouped under the specific category (e.g., "Sony CyberShot DSC-T500 10.1 Megapixel").

The secondary designation field 730 may display the proposed designation 620 (e.g., proposed by the item designation machine 110) as the secondary designation of the item (e.g., selected by the item designation machine 110). The buyer window 700 presents the item reference 722 under the secondary designation field 730 to indicate that the item is a specimen of the secondary designation, in addition to being a specimen of the primary designation 630. As illustrated, the secondary designation field 730 displays a separate category ("Camera & Photo > Digital Cameras"), and the buyer window 700 is presenting the item reference 722 as a specimen of that separate category. As shown, one or more additional specimens may be indicated as grouped under the separate category.

According to various example embodiments, one or more of the methodologies described herein may facilitate a sales transaction between the seller and the potential buyer transacted using the seller machine 170 and the potential buyer machine 180. The identification of the secondary designation of the item available for sale may have the practical effect of reducing time spent by the potential buyer in discovering the item, as well as various technical effects.

These technical effects may include a reduction in usage of computing resources. For example, reducing the time spent by the potential buyer may cause a corresponding reduction in processor cycles, bus traffic, network traffic, power consumption, thermal cooling load, or any combination thereof, with respect to the potential buyer machine 180. Moreover, reducing the time taken to sell the item may cause a corresponding reduction in usage of similar computing resources with respect to the network-based publication system, as well as with respect to the network environment 100 (e.g., network 160).

Although the discussion herein focuses on example embodiments involving a seller and a potential buyer of an item listed by a network-based publication system, in various example embodiments, the listed item is not available for sale. In such cases, the seller is replaced by a listing agent for the item, and the potential buyer is replaced by a potential viewer of the listing for the item.

Figure 8:
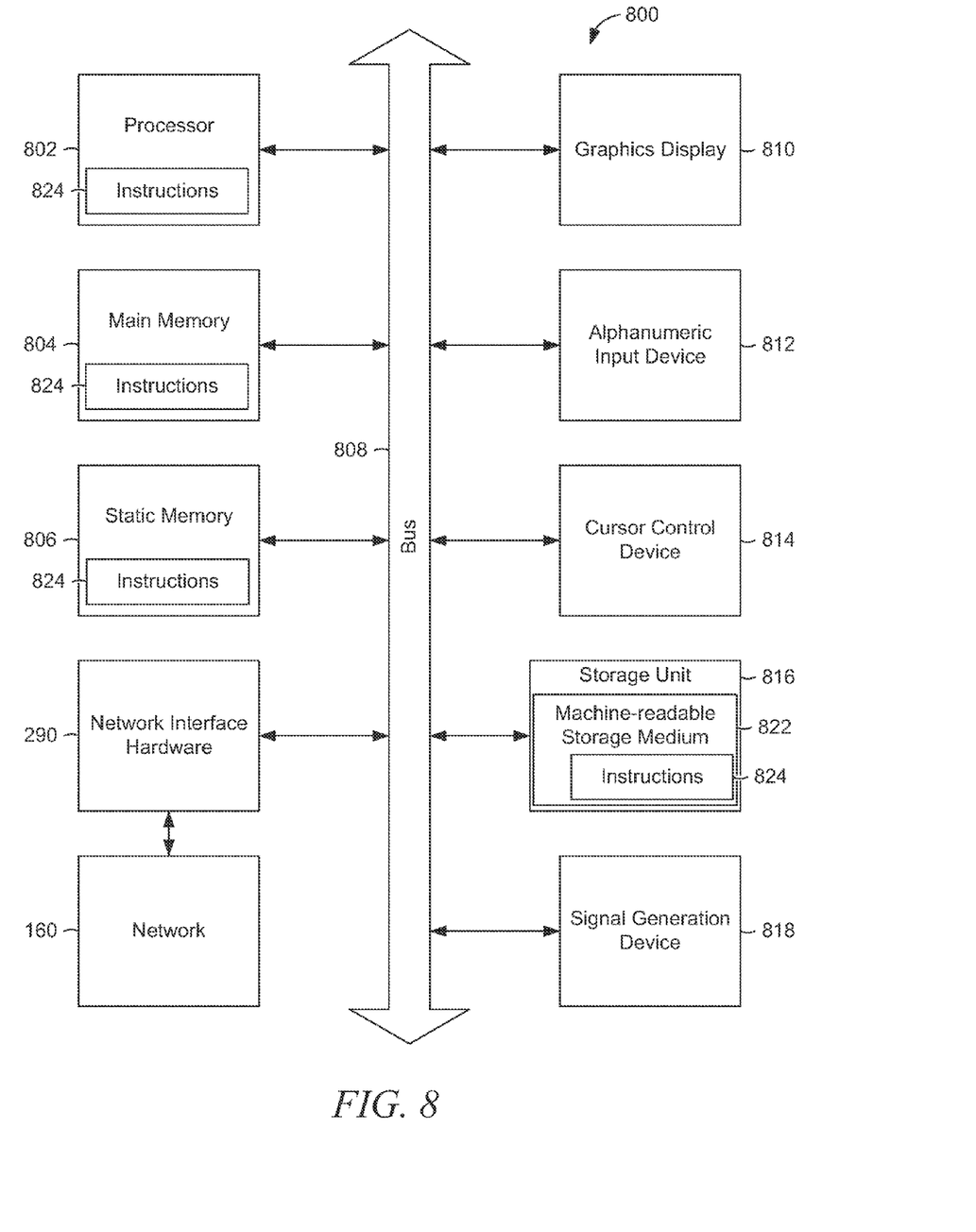
FIG. 8 is a block diagram illustrating a machine, according to some example embodiments, able to read instructions from a machine-readable storage medium and perform any one or more of the methodologies discussed herein.

FIG. 8 illustrates a machine 800 able to read instructions from a machine-readable medium (e.g., a machine-readable storage medium) and perform any one or more of the methodologies discussed herein. The machine 800, therefore, is able to function as the item designation machine 110. Specifically, FIG. 8 shows a diagrammatic representation of the machine 800 in the example form of a computer system and within which instructions 824 (e.g., software) for causing the machine 800 to perform any one or more of the methodologies discussed herein may be executed.

In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer (PC), a tablet PC, a set-top box (STB), a personal digital assistant (PDA), a cellular telephone, a smartphone, a web appliance, an electronic book viewer, a network router, switch or bridge, or any machine capable of executing instructions 824 (sequential or otherwise) that specify actions to be taken by that machine. Further, while only a single machine is illustrated, the term "machine" shall also be taken to include a collection of machines that individually or jointly execute the instructions 824 to perform any one or more of the methodologies discussed herein.

The machine 800 includes the processor 802 (e.g., a central processing unit (CPU), a graphics processing unit (GPU), a digital signal processor (DSP), an application specific integrated circuit (ASIC), a radio-frequency integrated circuit (RFIC), or any combination thereof), a main memory 804, and a static memory 806, which communicate with each other via a bus 808. The machine 800 may further include a graphics display unit 810 (e.g., a plasma display panel (PDP), a liquid crystal display (LCD), a projector, a light emitting diode (LED) display, or a cathode ray tube (CRT)). The machine 800 may also include an alphanumeric input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a speaker), and the network interface hardware 290.

The storage unit 816 includes a machine-readable storage medium 822 on which is stored the instructions 824 (e.g., software) embodying any one or more of the methodologies or functions described herein. The instructions 824 may also reside, completely or at least partially, within the main memory 804, within the processor 802 (e.g., within the processor's cache memory), within the static memory 806, or within any combination thereof, during execution by machine 800. Accordingly, the main memory 804, the static memory 806, and the processor 802 also constitute machine-readable storage media. The instructions 824 may be transmitted or received over the network 160 via the network interface hardware 290.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable storage medium 822 is shown in an example embodiment to be a single medium, the phrase "machine-readable storage medium" should be taken to include a single medium or multiple media (e.g., a centralized or distributed database, or associated caches and servers) able to store instructions (e.g., instructions 824) for execution by the machine 800 and that cause the machine 800 to perform any one or more of the methodologies described herein. The term "machine-readable storage medium" shall accordingly be taken to include, but not be limited to, a data repository in the form of a solid-state memory, an optical medium, a magnetic medium, or any combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware module that operates to perform certain operations as described herein.

In some embodiments, a hardware module may be implemented mechanically, electronically, or any combination thereof. For example, a hardware module may include dedicated circuitry or logic that is permanently configured to perform certain operations. For example, a hardware module may be a special-purpose processor, such as a field programmable gate array (FPGA) or an application-specific integrated circuit (ASIC). A hardware module may also include programmable logic or circuitry that is temporarily configured by instructions (e.g., software) to perform certain operations. For example, a hardware module may include software encompassed within a general-purpose processor or other programmable processor. It will be appreciated that the decision to implement a hardware module mechanically, in permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules each comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits or buses) that connect the hardware modules. In embodiments in which multiple hardware modules are configured or instantiated at different times, communications between such hardware modules may be achieved, for example, through the storage and retrieval of information in memory to which the multiple hardware modules have access. For example, one hardware module may perform an operation and store the output of that operation in a memory to which it is communicatively coupled. A further hardware module may then, at a later time, access the memory to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A computer-implemented method comprising:
receiving a seller-generated description of an item to be listed by a network-based publication system as available for sale, the receiving being via a network from a seller of the item;
receiving a selection of a primary designation of the item via the network from the seller;
identifying a secondary designation of the item distinct from the primary designation of the item, the identifying being based on the seller-generated description and performed by a module implemented using a processor of a machine; and
storing the primary and secondary designations of the item in an item record of the item within an item database of the network-based publication system communicatively coupled to the machine, the item record to indicate the item as a specimen of the primary and secondary designations.

2. The computer-implemented method of claim 1 further comprising:
listing the item as available for sale.

3. The computer-implemented method of claim 1 further comprising:
   presenting at least one of the primary designation or the secondary designation of the item to a potential buyer of the item.
4. The computer-implemented method of claim 1 further comprising:
   identifying a proposed designation of the item based on the seller-generated description of the item, the proposed designation being selectable by the seller as the primary designation of the item and selectable by the module as a secondary designation of the item; and
   presenting the proposed designation to the seller.
5. The computer-implemented method of claim 4, wherein:
   the identifying of the secondary designation of the item includes selecting the proposed designation as the secondary designation.
6. The computer-implemented method of claim 1 further comprising:
   accessing a price distribution database storing price distribution data corresponding to a plurality of potential designations of items, the plurality including the secondary designation of the item; wherein
   the seller-generated description of the item includes a price of the item; and
   the identifying of the secondary designation includes comparing the price of the item to the price distribution data.
7. The computer-implemented method of claim 6, wherein:
   the price distribution data includes a price range corresponding to the secondary designation of the item; and
   the price of the item is within the price range.
8. The computer-implemented method of claim 1 further comprising:
   accessing a sales history database storing sales history data corresponding to a plurality of potential designations of items, the plurality including the secondary designation of the item; wherein
   the identifying of the secondary designation includes selecting a best-selling designation as the secondary designation based on the sales history data.
9. The computer-implemented method of claim 1 further comprising:
   accessing a keyword database storing reference keywords corresponding to a plurality of potential designations of items, the plurality including the secondary designation of the item; wherein
   the seller-generated description of the item includes an item keyword; and
   the identifying of the secondary designation of the item includes matching the item keyword to at least one of the reference keywords.
10. The computer-implemented method of claim 9, wherein:
    the seller-generated description of the item includes a plurality of item keywords; and
    the identifying of the secondary designation of the item includes counting a number of matches between the plurality of item keywords and the reference keywords.
11. The computer-implemented method of claim 1, wherein:
    at least one of the primary designation or the secondary designation of the item is at least one of a category, a classification, a genre, or a tag.
12. A computer system comprising:
    a hardware-implemented communication module to:
       receive a seller-generated description of an item to be listed as available for sale, the hardware-implemented communication module to receive via a network from a seller of the item; and
       receive a selection of a primary designation of the item via the network from the seller; and
    a hardware-implemented designation module to:
       identify a secondary designation of the item distinct from the primary designation of the item based on the seller-generated description; and
       store the primary and secondary designations of the item in an item record of the item within an item database communicatively coupled to the computer system, the item record to indicate the item as a specimen of the primary and secondary designations.
13. The computer system of claim 12 further comprising:
    a hardware-implemented listing module to:
       list the item as available for sale.
14. The computer system of claim 12 further comprising:
    a hardware-implemented listing module to:
       present at least one of the primary designation or the secondary designation of the item to a potential buyer of the item.
15. The computer system of claim 12 further comprising:
    a hardware-implemented proposal module to:
       identify a proposed designation of the item based on the seller-generated description of the item, wherein the proposed designation is selectable by the seller as the primary designation of the item and selectable by the designation module as a secondary designation of the item; and
       present the proposed designation to the seller.
16. The computer system of claim 12, wherein:
    the seller-generated description of the item includes a price of the item; and
    the designation module is to:
       access a price distribution database configured to store price distribution data that corresponds to a plurality of potential designations of items, wherein the plurality includes the secondary designation of the item; and
       compare the price of the item to the price distribution data to identify the secondary designation of the item.
17. The computer system of claim 12, wherein:
    the designation module is to:
       access a sales history database configured to store sales history data that corresponds to a plurality of potential designations of items, wherein the plurality includes the secondary designation of the item; and
       select a best-selling designation as the secondary designation based on the sales history data to identify the secondary designation of the item.
18. The computer system of claim 15, wherein:
    the seller-generated description of the item includes an item keyword; and
    the designation module is to:
       access a keyword database configured to store reference keywords that correspond to a plurality of potential designations of items, wherein the plurality includes the secondary designation of the item; and
       match the item keyword to at least one of the reference keywords to identify the secondary designation of the item.
19. A machine-readable storage medium comprising instructions that, when executed by one or more processors of a machine, cause the machine to perform a method comprising:
    receiving a seller-generated description of an item to be listed as available for sale, the receiving being via a network from a seller of the item;

receiving a selection of a primary designation of the item via the network from the seller;

identifying a secondary designation of the item distinct from the primary designation of the item, the identifying being based on the seller-generated description; and storing the primary and secondary designations of the item in an item record of the item within an item database communicatively coupled to the machine, the item record to indicate the item as a specimen of the primary and secondary designations.

20. A system comprising:

means for receiving a seller-generated description of an item to be listed by a network-based publication system as available for sale, the receiving being from a seller of the item;

means for receiving a selection of a primary designation of the item from the seller;

means for identifying a secondary designation of the item distinct from the primary designation of the item, the identifying being based on the seller-generated description; and means for storing the primary and secondary designations of the item in an item record of the item within an item database, the item record to indicate the item as a specimen of the primary and secondary designations.

\* \* \* \* \*

UNITED STATES PATENT AND TRADEMARK OFFICE
CERTIFICATE OF CORRECTION

PATENT NO. : 8,458,049 B2  Page 1 of 1
APPLICATION NO. : 12/830200
DATED : June 4, 2013
INVENTOR(S) : Kun Wei It is certified that error appears in the above-identified patent and that said Letters Patent is hereby corrected as shown below:

On the Title Page, Item (56), in column 2, under "Other Publications", line 1, delete "Anon.," and insert -- Anon, --, therefor Signed and Sealed this
Eighteenth Day of November, 2014

Michelle K. Lee
*Deputy Director of the United States Patent and Trademark Office*